United States Patent
Marzahn (10) Patent No.: US 6,526,145 B2
(45) Date of Patent: Feb. 25, 2003

(54) DATA ENCRYPTOR/DECRYPTOR USING VARIABLE IN-PLACE I/O

(76) Inventor: David M. Marzahn, P.O. Box 812081, Boca Raton, FL (US) 33481-2081

(*) Notice: Subject to any disclaimer, the term of this patent is extended or adjusted under 35 U.S.C. 154(b) by 0 days.

(21) Appl. No.: 09/307,677

(22) Filed: May 10, 1999

(65) Prior Publication Data

US 2001/0012362 A1 Aug. 9, 2001

Related U.S. Application Data

(63) Continuation-in-part of application No. 08/790,608, filed on Jan. 29, 1997, now abandoned.

(51) Int. Cl.$^7$ .............................. H04L 9/18; H04L 9/28
(52) U.S. Cl. .......................................... 380/42; 380/28
(58) Field of Search ...................... 380/42, 28

(56) References Cited

U.S. PATENT DOCUMENTS

| | | | |
|---|---|---|---|
| 4,249,180 A | * 2/1981 | Eberle et al. | 380/37 |
| 4,776,011 A | * 10/1988 | Busby | 380/37 |
| 4,780,905 A | * 10/1988 | Cruts et al. | 380/44 |
| 4,937,867 A | * 6/1990 | Kasparian et al. | 380/35 |
| 5,272,755 A | * 12/1993 | Miyaji et al. | 380/30 |
| 5,452,358 A | * 9/1995 | Normile et al. | 380/42 |
| 5,535,277 A | * 7/1996 | Shibata et al. | 380/28 |
| 5,539,827 A | * 7/1996 | Liu | 380/37 |
| 5,778,074 A | * 7/1998 | Garcken et al. | 380/37 |
| 5,796,826 A | * 8/1998 | Park | 380/5 |
| 5,799,090 A | * 8/1998 | Angert | 380/43 |

OTHER PUBLICATIONS

Schneier, Bruce, Applied Cryptography, 1996, p. 195.*

* cited by examiner

Primary Examiner—Gilberto Barron
Assistant Examiner—Douglas J Meislahn
(74) Attorney, Agent, or Firm—Malin, Haley & DiMaggio, P.A.

(57) ABSTRACT

A computer implemented process for data encryption or data decryption using a computer is disclosed. In one embodiment, the process includes the following steps (a) reading an input dataset with a physical read determined by an input/output control variable; (b) adding a value of a keypointer to a starting offset value of an access code key to determine a current element of the access code key; (c) exclusive ORing the current element with a current value of a data STRING byte determined by a value of a STRING pointer and saving as a new data STRING byte value; (d) replacing the new data STRING byte value with a value of a current element of a matrix array pointed to by a matrix array pointer and saving as a replaced data STRING byte value; (e) subtracting an increment/decrement counter starting value from the replaced data STRING byte value to yield a result and saving the result as a current STRING byte; (f) reversing the current STRING byte and saving as a reversed current STRING byte; and (g) repeating steps (a) through (f) until all data has been either encrypted or decrypted. The computer implemented process also allows an input dataset to also be an output dataset.

22 Claims, 4 Drawing Sheets

MATRIX ARRAY

| 163 | 83  | 37  | 21  | 99  | 80  | 202 | 107 | 255 | 60  | 127 | 33  | 76  | 100 | 28  | 243 |
|-----|-----|-----|-----|-----|-----|-----|-----|-----|-----|-----|-----|-----|-----|-----|-----|
| 111 | 158 | 98  | 136 | 32  | 3   | 27  | 65  | 73  | 43  | 64  | 22  | 14  | 66  | 250 | 128 |
| 20  | 11  | 38  | 61  | 77  | 2   | 34  | 204 | 81  | 68  | 133 | 25  | 88  | 117 | 146 | 119 |
| 211 | 209 | 254 | 242 | 102 | 200 | 159 | 219 | 183 | 192 | 185 | 195 | 9   | 35  | 162 | 186 |
| 26  | 23  | 29  | 95  | 41  | 96  | 184 | 124 | 228 | 24  | 174 | 101 | 12  | 36  | 87  | 144 |
| 5   | 40  | 251 | 1   | 182 | 235 | 222 | 78  | 44  | 208 | 177 | 213 | 205 | 249 | 180 | 67  |
| 69  | 240 | 18  | 4   | 13  | 75  | 52  | 241 | 220 | 194 | 247 | 7   | 226 | 233 | 215 | 16  |
| 223 | 170 | 227 | 134 | 120 | 45  | 123 | 47  | 116 | 126 | 145 | 118 | 71  | 218 | 121 | 10  |
| 31  | 139 | 225 | 190 | 217 | 42  | 115 | 168 | 19  | 173 | 187 | 129 | 230 | 201 | 152 | 166 |
| 79  | 122 | 46  | 189 | 232 | 157 | 238 | 207 | 142 | 191 | 216 | 169 | 245 | 149 | 17  | 54  |
| 188 | 210 | 62  | 0   | 221 | 231 | 143 | 199 | 135 | 155 | 113 | 237 | 176 | 137 | 74  | 193 |
| 172 | 90  | 197 | 236 | 94  | 214 | 84  | 56  | 70  | 58  | 63  | 138 | 160 | 147 | 131 | 153 |
| 57  | 175 | 105 | 59  | 206 | 178 | 239 | 167 | 53  | 141 | 6   | 253 | 39  | 92  | 196 | 151 |
| 89  | 49  | 161 | 48  | 234 | 91  | 181 | 110 | 154 | 132 | 125 | 55  | 104 | 164 | 86  | 112 |
| 244 | 130 | 108 | 114 | 72  | 248 | 140 | 165 | 148 | 109 | 212 | 85  | 179 | 171 | 150 | 198 |
| 97  | 103 | 51  | 15  | 224 | 156 | 252 | 106 | 229 | 93  | 30  | 82  | 246 | 203 | 50  | 8   |

OFFSET 0 (top-left corner 163) · OFFSET 15 (top-right corner 243) · OFFSET 163 (value 0) · OFFSET 240 (bottom-left 97) · OFFSET 255 (bottom-right 8)

*Fig. 4*

DATA ENCRYPTOR/DECRYPTOR USING VARIABLE IN-PLACE I/O

This application is a continuation-in-part of U.S. application Ser. No. 08/790,608, filed Jan. 29, 1997 now abandoned.

BACKGROUND OF THE INVENTION

The present invention relates generally to encryption techniques and in particular to a computer implemented software data encryptor/decryptor.

Computer cryptography, securing secret data, private data and authentication of information using software data encryption is an ongoing concern in the public and private sectors. Use of file based and device driver encryption is secure to the extent of the unknown key(s). Personal computers with a standard operating system such as DOS that uses device driver encryption/decryption are bound to I/O overhead, reside in random access memory and can expose a method of encryption. Device driver cryptosystems are useful for elimination of file specific encryption/decryption and are virtually transparent to the user.

Firmware cryptosystems like device driver cryptosystems are virtually transparent to the user. Physically implemented firmware cryptosystems require hardware embedded attachment that exposes a method of encryption, and can be bound to I/O overhead. Firmware cryptosystems generally require transported cipher data to a target machine to have the same hardware embedded attachment as a deciphering agent. This can be a cumbersome approach when wide area networks are involved and/or many PC's are involved in the process.

Private key cryptosystems generally require the secret key(s) used for encryption as the key(s) used for decryption. Public key cryptosystems generally used over networks generate a public and private key from a mathematical computational process. The generated private key is kept secret and should only be known by the recipient. The sender uses the public key to encrypt the data file or message and the recipient decrypts the data with his or her private key. Under a public key cryptosystem only the recipient's private key can decrypt the message data. Public key cryptosystems require at least two keys and a process to generate the keys The present invention discloses a "data encryptor/decryptor using variable in-place I/O" and addresses on standard operating systems such as DOS and WINDOWS private key cryptosystem capability with varying degrees of data security for private use as well as public use over networks and other distribution channels. The present invention can also be used for data authentication and digital signatures.

Data authentication is used for proof of authentic, non-corrupted reproduction of data. Cryptographic processes can be used for authentication because of the level of mathematical proofs required for verification of an authentic binary dataset.

Use of the present invention method and apparatus as a process for authentication is achieved by applying an expected binary dataset authenticity certificate and/or digital signature to the data encrypted. Decryption of the dataset that includes the authenticity certificate and/or digital signature guarantees a perfect binary equivalent of the original data when the certificates and/or digital signatures match as binary equivalents or are validated as expected.

SUMMARY OF THE INVENTION

The present invention provides for a "data encryptor/decryptor using variable in-place I/O", preferably in the form of computer software. The software can be installed on a hard drive, or be loaded on a floppy disk and run therefrom. Though not preferred, the process can also be burned into ROM. The present invention provides a method and apparatus which is implemented for private key cryptosystems and can be used in conjunction with public key cryptosystems. The invention processes dataset(s) and/or file(s) based on binary representation. The symbol "^" will be used throughout the disclosure to represent the exponential symbol. Thus, "2^8" will mean "two to the eighth" or "two hundred and fifty six".

Private key file based cryptosystems use an input source file and designate an encrypted output file. The present invention implementation can process the input source file "in-place" eliminating the creation of a new output file, which increases security. In addition the present invention can also process separate output file(s) for leaving the input source file(s) encrypted or in their original form.

The present invention implementation can be executed directly from a disk inserted in a floppy disk drive without installing to a hard disk drive. This avoids any trace of a ciphering agent, which is an obvious security benefit. To increase the level of security by orders of magnitude the present invention can process multiple times using multiple variable length keys the same input source data adding to the total number of possible combinations of encryption/decryption keys.

Furthering the complexities of the encryption/decryption process the present invention method and apparatus can include multiple matrix arrays with variable ordered element pairs. The present invention can be executed using the decryptor method as an encryption process. Conversely, the encryptor method can then be used as the decryption process. This effectively increases the data security by increasing the total number of possible combinations of encryption/decryption keys and cipher layers.

The invention provides an encryption/decryption method and apparatus using a computer with a central processing unit "CPU" accessing random access memory "RAM" controlling an input/output "I/O" device. The I/O device could be in RAM, or a peripheral storage unit such as a floppy disk.

The method and apparatus include software programmed instructions, associated with the CPU of a computer, for carrying out the arithmetic, logical and manipulative functions that controls and directs the method and apparatus processing. The method and apparatus Access Code Key table byte is logically XOR'ed with a current data STRING byte pointed to. The initial keypointer ("KP") value is calculated by dividing the input dataset size that is less than the I/O Control variable ("IOC"), by the length of the access code key ("KEYLENGTH"). If the dataset size is greater than IOC, IOC is used as a dividend and the KEYLENGTH is the divisor.

The remainder relative to zero is the initial KP value. KP is added to the relative offset of the Access Code Key table. The access code key byte pointed at with KP is logical XOR'ed with the current data STRING byte pointed to with a string pointer ("SP"). Then the user XOR code UWORD is logically XOR'ed with the current data STRING byte pointed to with SP. After swapping several symbols, the current data STRING byte pointed to by SP, is targeted for replacement with the current Matrix Array element pointed at by matrix array pointer ("MAP").

Initial Counter Starting value ("O") is calculated by dividing the size of the dataset by the Matrix Array size. The remainder relative to zero is used as the initial counter starting value O.

The replacement Matrix Array element is pointed at via MAP. The MAP is calculated by adding the current data STRING byte pointed to SP, to the relative offset of the Matrix Array. The initial counter starting value through the iteration of the processing loop is subtracted from the value replaced from the Matrix Array. Then the counter starting value is decremented.

The processing loop reverses the STRING to relative offset of reverse string ("OREVSTR") and writes OREVSTR to output.

The method and apparatus controls the physical input size read by the I/O Control variable IOC. Preferably, the Matrix Array is in effect and IOC preferably is a minimum of the Matrix Array size, or an exact multiple thereof. When the Matrix Array is bypassed, IOC preferably is equal to the KEYLENGTH or an exact multiple of the KEYLENGTH.

The method and apparatus controls the physical output pointer ("ODP") via IOC derived from the above criterion using a record counter ("PRC") as a multiplier to IOC. The product ODP becomes a relative pointer from the beginning of the output dataset. Through the iteration of the processing loop, the output pointer is relatively displaced by each new product.

The method and apparatus controls the STRING reversal by using pointers, one pointing at the low memory address of the STRING, and one pointing at the high memory address of the reverse string OREVSTR. Through the iteration of the processing loop the pointers are incremented and decremented respectively.

The opposite for Encryption/Decryption method and apparatus initializes the Counter Starting value and keypointer KP to zero. Opposite is in reference to the above encryption/decryption method and apparatus wherein the data being processed is either being ciphered or deciphered.

The complete process to data end, effectively has no upper limit. The encryption/decryption method and apparatus can be applied up to infinity with respect to either ciphering (encrypting) or deciphering(decrypting). Each process pass can have unique keys, or identical keys, or any combination. The encryption/decryption method and apparatus is scaleable for multiple Matrix Arrays, and/or multiple Access Code Keys, and/or multiple user XOR bit codes.

The method and apparatus utilizes a finite number of Matrix Array(s) structured with unequal element pairs, with a preferred 2^7 set of pairs, and a numerical range of preferably 2^8. The Matrix Array is constructed with element pointer pairs that are relative to zero with equivalent numerical values, with the pairs ordered randomly.

Thus, the summarizing the present invention provides a method and apparatus for data encryption/decryption. In the method and apparatus of the present invention, the initial KP keypointer value is calculated by dividing the input dataset size that is less than an I/O Control variable IOC, by the KEYLENGTH. If the dataset size is greater than IOC, IOC is used as a dividend and the KEYLENGTH is the divisor. The remainder relative to zero is the initial keypointer value of KP. KP is added to the relative offset of the Access Code Key table. The access code key byte pointed at is logical XOR'ed with the current data STRING byte pointed to. Then the user XOR bit code UWORD is logical XOR'ed with the current data STRING byte pointed to. After limited symbol swapping, the current data STRING byte pointed to is targeted for replacement with a Matrix Array element. The replacement Matrix Array element is selected by adding the current data STRING byte pointed to, to the relative offset of the Matrix Array. This creates a Matrix Array Pointer MAP. The initial counter starting value through the iteration of the processing loop is subtracted from the value replaced from the Matrix Array. Then the counter starting value is decremented. The processing loop reverses the STRING to OREVSTR and writes OREVSTR to output. The method and apparatus controls the physical input size read by the I/O Control variable IOC. When the Matrix Array is in effect, IOC preferably is a minimum of the Matrix Array size, or an exact multiple thereof. When the Matrix Array is bypassed, IOC preferably is equal to the KEYLENGTH or an exact multiple of the KEYLENGTH. The method and apparatus controls the physical output pointer ODP via IOC derived from the above criterion using a record counter PRC as a multiplier to IOC. The product ODP becomes a relative pointer from the beginning of the output dataset. at Through the iteration of the processing loop, the output pointer is relatively displaced by each new product. The method and apparatus controls the STRING reversal by using pointers, one pointing at the low memory address of the STRING, and one pointing at the high memory address of the reverse string OREVSTR. Through the iteration of the processing loop the as pointers are incremented and decremented respectively. The converse for Encryption/Decryption method and apparatus initializes the Counter Starting value and KP to zero. The converse is in reference to the above encryption/decryption method and apparatus wherein the data being processed is either being encrypted or decrypted. The method and apparatus utilizes a finite number of Matrix Array(s) structured with unequal element pairs, with a preferred 2^7 set of pairs, and a numerical range of preferably 2^8. The Matrix Array is constructed with element pointer pairs that are relative to zero with equivalent numerical values, with the pairs ordered randomly.

DETAILED DESCRIPTION OF THE PREFERRED EMBODIMENT

Figure 1:
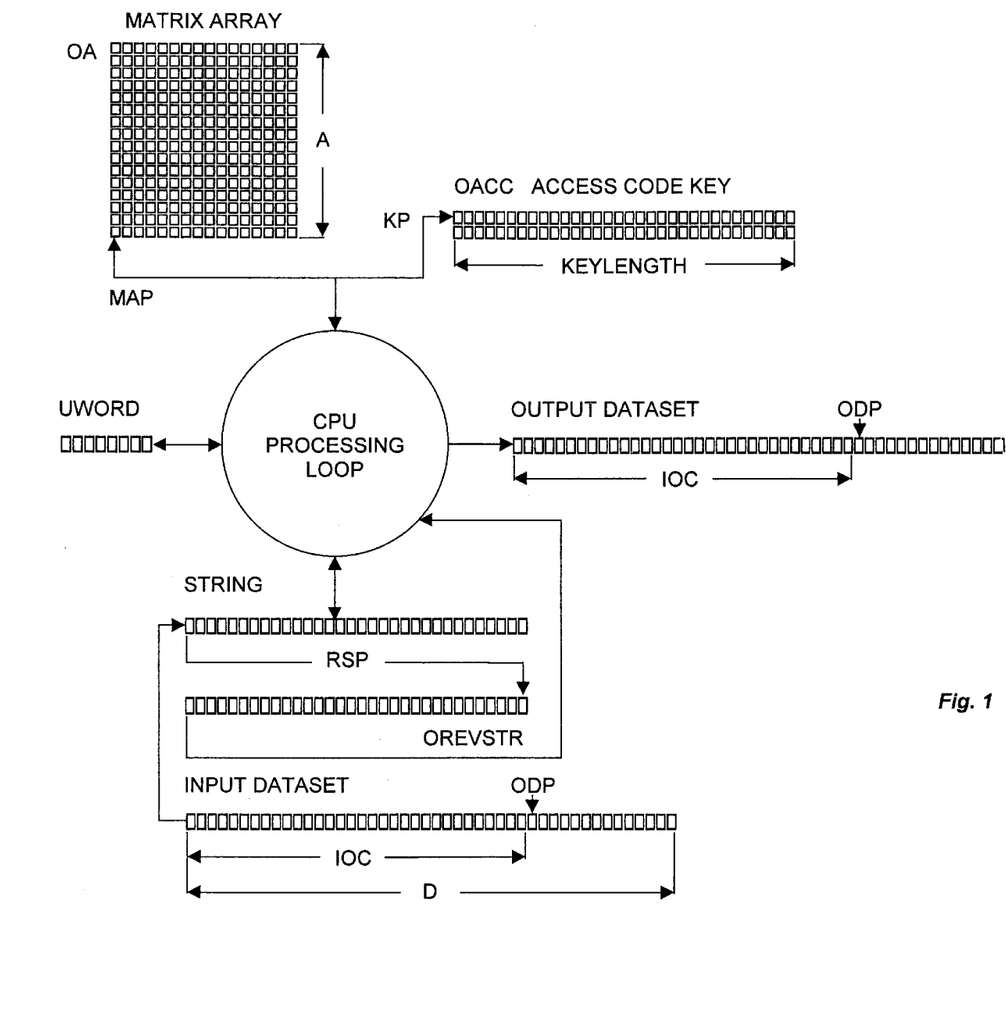
FIG. 1 is a schematic system processing diagram showing a encryption/decryption method and apparatus according to a preferred embodiment.

Referring now to FIG. 1, the following are brief descriptions of variables used in the methods and apparatus for encryption and/or decryption. The following variables' physical implements reside in a computer with a CPU accessing RAM controlling an I/O device. The I/O device preferably is capable of relative offset pointing and can be standard disk peripherals, as well as virtual disk and/or memory block, including RAM drives. Thus, the following variables or constants, including the counters, reside in RAM (Random Access Memory) and can be accessed by the computer's CPU (Central Processing Unit) and provide specific values which are used during the computer implemented process. Furthermore, the data can be physically transferred within the computer or outside the computer, and can also be stored on a floppy disk.

Figure 2:
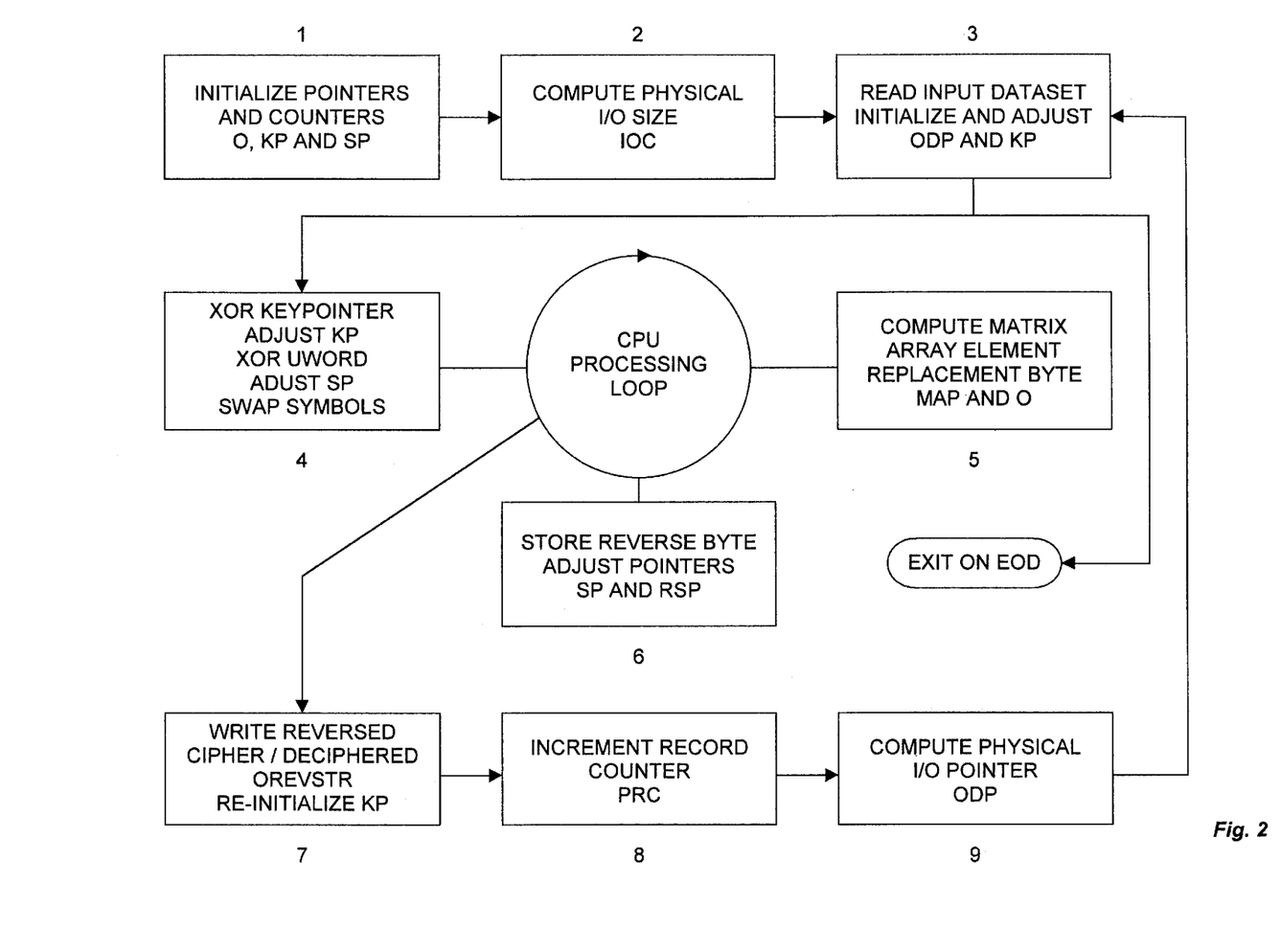
FIG. 2 is a schematic flow diagram showing a encryption/decryption method and apparatus as an integral of the schematic processing diagram showing a encryption/decryption method and apparatus in FIG. 1, including the various steps (machine instructions) performed in the central processing unit of a computer.

KEYLENGTH=Length of Access Code Key
KP=Keypointer, points @ Access Code Key table elements
O=Increment/Decrement Counter Starting Value
OA=Relative Offset of Matrix Array
TO=Tail Counter Starting Value
ODP=Relative Offset Pointer of Read/Write head or memory block
OACC=Relative Offset of Access Code Key. The access code key can be
stored in static RAM with the user entering a key, can be read in, or
can be permanently stored in the program.
OREVSTR=Relative Offset of Reverse STRING
PRC=Physical Record Counter
STRING=Relative Offset of Data STRING
SP=STRING Pointer
RSP=Reverse STRING Pointer
MAP=Matrix Array Pointer
UWORD=User XOR bit code
D=Size of Dataset
A=Size of Array=preferably 2^8 can also be other sizes and have
multiple arrays
IOC=I/O Control Variable or Value=preferably 2^8 or any multiple of a power of 2 >2^8. Limited by hardware. Can be a static value or a variable or a value changed based on input data or parameters. The value can be manually inputted by the user, derived from user input or some type of logic determination, or programmed. The IOC tells the computer or machine how much to read in. The IOC controls the read/write head of the I/O device for the read in. The larger the read the faster. The size can change depending on how it is implemented.
R=Remainder after division
RELOADTAIL=Indicates D was not evenly divisible
RELOAD=Indicates a fractional read With references to FIG. 1, FIG. 2 illustrates the method and apparatus for encrypting and/or decrypting data.

Block 1. In the encryptor/decryptor method and apparatus if the I/O Control variable IOC is greater than a known finite dataset preferably less than or equal to 2^16 in size, division of the dataset by a Matrix Array size of A is processed. If the remainder R is not zero then R is used as a starting decrement counter and subtraction value O. O is then adjusted relative to zero by subtracting 1.

If R equals zero then O=A-1. If the dataset size is less than A then O=the dataset size-1. When the dataset size is greater than IOC, divide the dataset size by A. If R equals zero RELOADTAIL equals no. If R is not equal to zero then a Tail Counter Starting Value OT equals R-1 and RELOADTAIL equals yes.

When the dataset size is greater than IOC, the value IOC is divided by KEYLENGTH when it is greater than or equal to the KEYLENGTH. If R equals zero then KEYLENGTH-1 is used as a keypointer KP from the offset of the first byte of the Access Code Key table which is used to logical XOR the current data STRING byte pointed to SP which is initially set at zero. If R is nonzero then R-1 is used as a keypointer KP from the offset of the first byte of the Access Code Key table which is used to logical XOR the SP byte pointed at. If the dataset is smaller than the KEYLENGTH KP will equal 0. The KP is then saved.

Blocks 2 and 3. Data is read with IOC controlling the size of the input dataset physical read and output dataset relative pointer. If the number of bytes read is equal to IOC, multiply the record counter PRC by IOC. The product becomes the relative offset pointer from offset 0 in the dataset ODP. If the number of bytes read is less than IOC (a fractional read) and RELOADTAIL is yes then RELOAD equals yes.

Block 3. The offset of the element of Access Code Key is pointed at relative to KP. KP is added to the starting offset of the Access Code Key table OACC which then points at the current element of OACC.

Block 4. This process logical XOR's from the Access Code Key table byte pointed to by KP, with the current data STRING byte pointed to by SP. If KP equals zero, KP then equals KEYLENGTH-1. This will point to the last element in the Access Code Key table. Else If KP does not equal zero, then KP is decremented. If KP equals zero, KP then equals KEYLENGTH-1. This will point to the last element in the Access Code Key table. The STRING byte pointed to by SP is then logical XOR'ed with a user XOR bit code UWORD. Decrement the value of SP. Swap symbol(s) set with byte(s) pointed to by SP.

Block 5. The value of the converted STRING byte pointed to by SP is added to the starting offset of the Matrix Array OA. This MAP is a relative offset pointer to the Matrix Array byte used as a replacement byte in the data STRING. If RELOAD equals yes then OT replaces O. O is then used to subtract from the replaced byte.

Block 6. The encrypted or decrypted symbol pointed at by SP is moved to a reverse string OREVSTR. OREVSTR is the converted reverse of the data STRING. The SP is incremented. The RSP is decremented.

Block 7. When the number of bytes in the data STRING is exhausted, the saved KP is restored and the OREVSTR data string is written to output.

Block 8. Increment the record counter PRC.

Block 9. Multiply the record counter PRC by IOC. The product becomes the relative offset pointer from offset 0 in the dataset ODP. This process is repeated until end of data. The above process can also be stated as:

Initialize Phase 1: Compute Counter Starting Value O.
If D<=2^16 Then compare the 16 bit unsigned binary integer S to:
  If D<A Then O=D-1, or
  If D=A Then O=A-1, or
  If D>A Then If D<IOC Then D/A=O,
  If O not=zero Then O=R-1
  Else If O=zero Then O=A-1
  If D>2^16 Then O=A-1
Tail check: Compute Tail Counter Starting Value OT.
  If D>IOC Then D/A
  If R=0 RELOADTAIL=no
  Else If R not=0 Then OT=R-1 RELOADTAIL=yes
Initialize Phase 2: Compute keypointer starting value KP.
  If D>IOC Then If IOC=>KEYLENGTH Then IOC/KEYLENGTH
  If R not=0 Then KP=R-1
  Else If R=0 Then KP=KEYLENGTH-1
  If IOC<KEYLENGTH Then KP=0
  If D<=IOC Then If D=>KEYLENGTH Then D/KEYLENGTH
  If R not=0 Then KP=R-1
  Else If R=0 Then KP=KEYLENGTH-1
  If D<KEYLENGTH Then KP=0

I/O primer:
   Keyppointersave=KP
   Get from Input Dataset IOC bytes to fill STRING.
   Determine if there is a fractional STRING read. If IOC ># of bytes read Then Reload=yes
   Determine if there is a fractional STRING read.
   If IOC ># of bytes read Then If KEYLENGTH not equal 0
   number of bytes read/KEYLENGTH
   If R not=0 Then KP=R-1
   Else If R=0 Then KP=KEYLENGTH-1
Processing Loop:
   IOC*PRC=ODP
   Setup STRING Reversal, logical XOR, and Matrix Array Element Conversion:
      OREVSTR=OREVSTR+Actual # of bytes read-1
      IF KEYLENGTH=0 GOTO Process UWORD
      OACC=OACC+KP
      XOR KP[byte] to STRING[byte]
      IF KP=0 Then KP=KEYLENGTH-1
      Else KP=KP-1
      IF KP=0 Then KP=KEYLENGTH-1
Process UWORD:
   XOR UWORD to STRING[byte]
   Decrement STRING[byte]
   Swap symbol(s) set with byte(s) pointed to by SP.
      OA=OA+STRING[byte]
   If Reload=no Then STRING[byte]=STRING[byte]-O
   Else O=OT Then STRING[byte]=STRING[byte]-O
   move STRING[byte] to OREVSTR[byte]
   Decrement OREVSTR
   Increment STRING
   Loop to Processing Loop until end of data.

Figure 3:
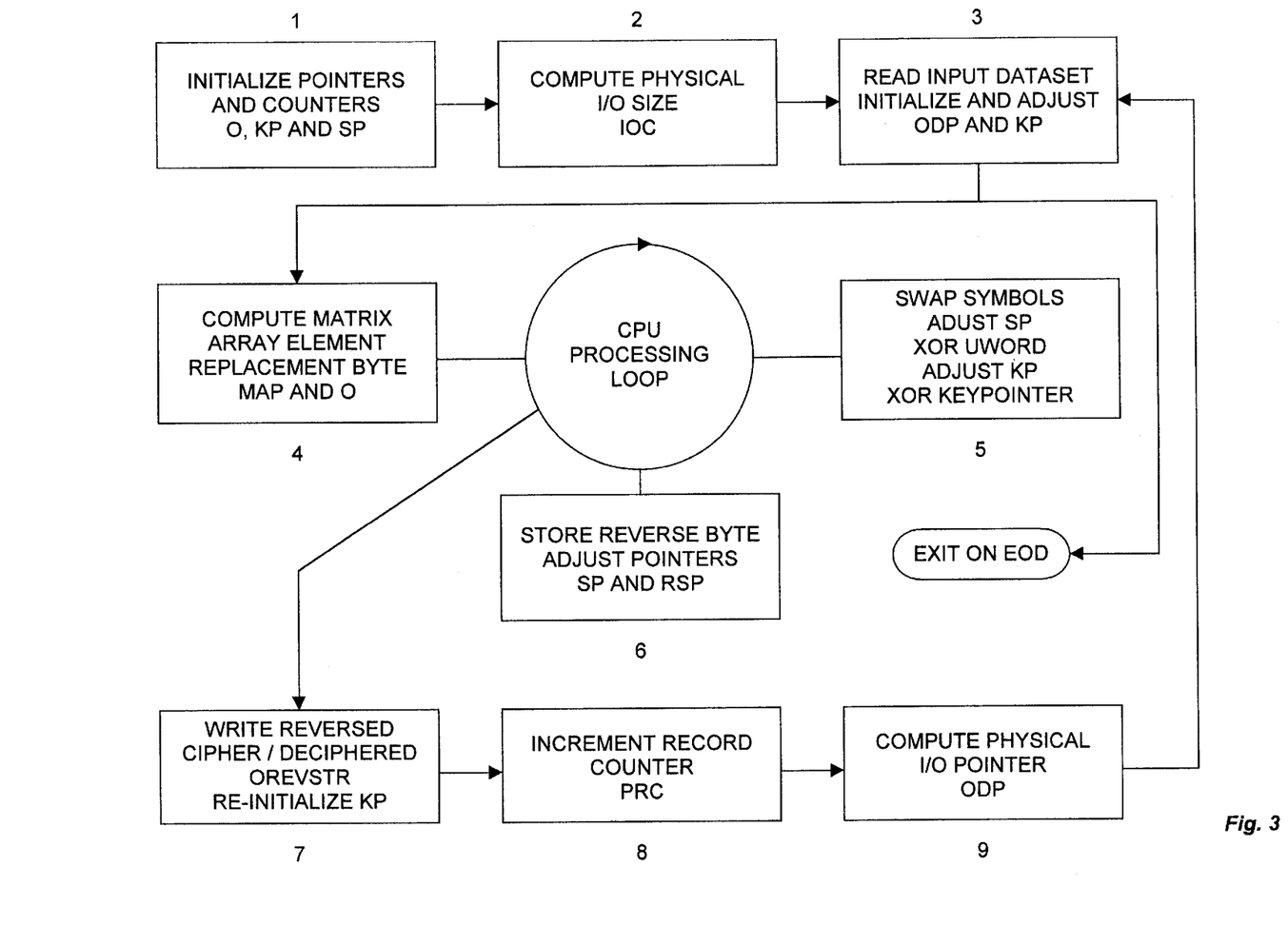
FIG. 3 is a schematic flow diagram showing a converse encryption/decryption, method and apparatus (Referring to FIG. 2) as an integral of the schematic processing diagram showing a encryption/decryption method and apparatus in FIG. 1, including the various steps (machine instructions) performed in the central processing unit of a computer.

With references to FIG. 1, FIG. 3 illustrates the method and apparatus for converse processing of the dataset when the process referring to FIG. 2. was last applied to the data symbols.

Block 1. Initialize the starting increment counter and addition value O to zero. Initialize KP and SP to zero.

Blocks 2 and 3. Data is read with IOC controlling the size of the physical read and output relative pointer.

Block 3. If the number of bytes read is equal to IOC, multiply PRC by IOC. The product becomes the relative offset pointer from offset 0 in the dataset IOC*PRC=ODP. The offset of the Access Code Key table OACC is pointed at relative to KP. KP is added to the starting offset of the Access Code Key table OACC.

Block 4. The value of O is added to the value of the SP then added to the starting offset of the Matrix Array. This MAP is a relative offset pointer to the Matrix Array byte used as a replacement byte in the data STRING. Increment O.

Block 5. Swap symbols set with byte(s) pointed to by SP. Increment the value of SP. The SP byte pointed to is then logical XOR'ed with a user XOR bit code UWORD. This process logical XOR's from the Access Code Key table byte pointed to by KP, with the current data STRING byte pointed to SP. If KP equals the KEYLENGTH then set KP to equal 0. Else If KP is not equal to the KEYLENGTH then increment KP. If KP equals the KEYLENGTH then set KP to equal 0.

Block 6. The ciphered or deciphered SP is moved to OREVSTR. OREVSTR is the converted reverse of the data STRING. The SP pointer is incremented. The RSP pointer is decremented.

Block 7. When the number of bytes in the data STRING is exhausted, the KP is initialized to zero, and the OREVSTR data string is written to output.

Block 8. Increment the record counter PRC.

Block 9. Multiply the record counter PRC by IOC. The product becomes the relative offset pointer from offset 0 in the dataset ODP. This process is repeated until end of data.

While the apparatus hereinbefore described is effectively adapted to fulfill the aforesaid objects, it is to be understood that the invention is not intended to be limited to the specific preferred embodiment of encryption/decryption method and apparatus set forth above. Rather, it is to be understood as including all reasonable equivalents within the scope of the following claims.

Figure 4:
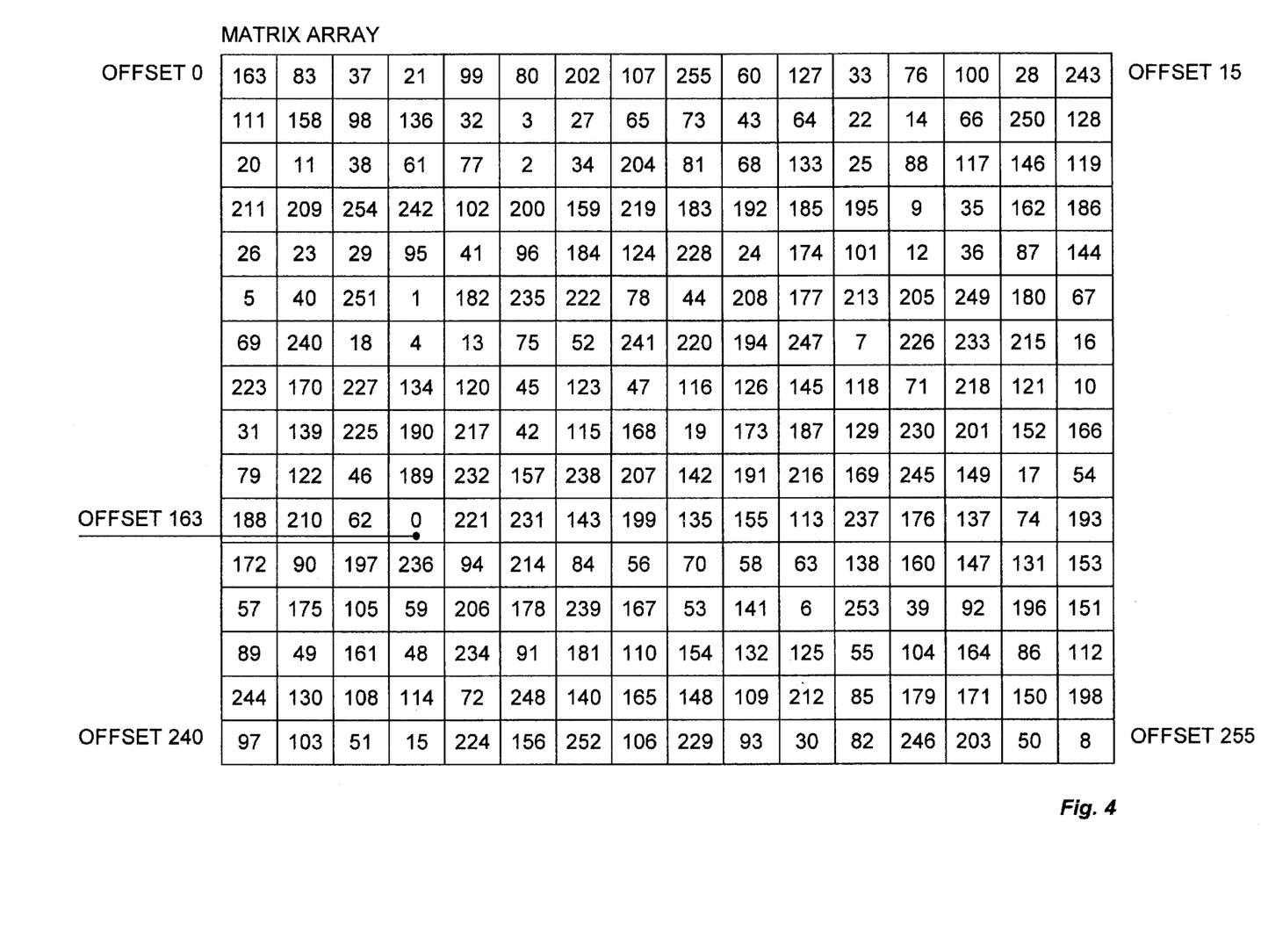
FIG. 4 illustrates one of a plurality of possible matrix array constructs or data structures and having ordered element pairs, where the matrix array is of a 2^8 size.

FIG. 4 illustrates one of a plurality of possible matrix array constructs or data structures and having ordered element pairs, where the matrix array is of a $2^8$ size. It should be apparent, that the matrix array can be referenced in static RAM, stored in a file and read into RAM, burned into EPROM or ROM, etc. Where burned into ROM or EPROM, during initialization, additional programming instructions would be provided to indicate the location of the Matrix Array's OA. The matrix can also be manually created or computer generated.

Accordingly, the present invention provides the following advantages, amongst others:

1. Computes the physical I/O Control vector for an input dataset encryption/decryption, and in-place data output encryption/decryption for an output dataset. The method controls the physical input size read using the I/O Control variable. When the Matrix Array is in effect, the I/O Control variable preferably is a minimum of the Matrix Array size, or an exact multiple thereof. In the instance where a multiple of the Matrix Array size is used as the I/O Control variable, either the byte sum of the Access Code Key byte(s) is used to divide $2^8$, and the remainder is multiplied by $2^8$ with the product utilized as the I/O Control variable. Or the first user XOR bit code byte value is multiplied by $2^8$ with the product utilized as the I/O Control variable. Or a random multiple of the Matrix Array size is selected and is utilized as the I/O Control variable.

2. Controls the physical output pointer via the I/O Control variable derived from criteria established in advantage 1, and uses a record counter as a multiplier with the I/O Control variable. The product is utilized as a relative pointer from the beginning of the output dataset. Through the iteration of the processing loop, the output pointer is relatively displaced by each new product. The methods record counter starting at 0 is incremented after each output.

3. Uses a scaleable processing loop using multiple Matrix Arrays, and/or multiple Access Code Keys, and/or multiple user XOR bit codes. The methods scaleable processing loop processes with or without Matrix Array(s) or Access Code Key(s) or user XOR bit code(s).

4. Uses a derived Matrix Array replacement value using a permutation value from the input dataset STRING pointed at via the STRING Pointer and adding it to the value of the relative offset of the Matrix Array. This MAP directly points to the replacement value in the Matrix Array.

5. Calculates the tail counter starting value if the input dataset size is greater than the I/O Control variable, divide the input dataset preferably by $2^8$. A non zero remainder is decremented and is utilized as the tail counter starting value.

6. Initially points to Access Code Key(s) by comparing the input dataset size by the I/O Control variable. When the input dataset size is greater than the I/O Control variable, the I/O Control variable is divided by the KEYLENGTH when it is greater than or equal to the KEYLENGTH. If the remainder equals zero then KEYLENGTH−1 is used as a KP to the first byte of the Access Code Key table which is used to logical XOR the current data STRING byte pointed to by the STRING Pointer. If the remainder is non zero then the remainder−1 is used as a KP to the first byte of the Access Code Key table which is used to logical XOR the byte pointed to by the STRING Pointer. If the dataset is smaller than the KEYLENGTH the KP will equal 0.

7. Calculates the counter starting value when the I/O Control variable is greater than a known finite dataset size less than or equal $2^{16}$, division of the dataset size by a Matrix Array size of $2^{8}$ is processed. If the remainder is not zero then the remainder is used as the counter starting decrement and subtraction value. The counter starting decrement and subtraction value is then adjusted relative to zero by subtracting 1. If the remainder equals zero then the counter starting decrement and subtraction value equals the Matrix Array size−1. If the dataset size is less than the Matrix Array size then the counter starting decrement and subtraction value equals the dataset size−1.

8. Calculates the counter starting value with elimination of the tail counter starting value for converse encrypt or decrypt processing, by setting the counter starting increment and addition value to 0.

9. Initially points to Access Code Key(s) for converse encrypt or decrypt processing, by setting the KP to 0.

10. Utilizes Access Code Key(s) element(s) by decrementally pointing at each Access Code Key(s) elements through the iteration of the processing loop.

11. Utilizes Access Code Key(s) element(s) by incrementally pointing at each Access Code Key(s) element(s) through the iteration of the processing loop.

12. Derives a Matrix Array replacement value as discussed in advantage 4, for converse encrypt or decrypt processing, by adding the counter starting value to the value of the relative offset of the Matrix Array. This MAP directly points to the replacement value in the Matrix Array.

13. Ordering Matrix Array elements wherein pairs of elements point to corresponding relative offsets and contain corresponding exchange values. The counter starting decrement and subtraction value is utilized to point at the Matrix Array's individual elements.

14. Ordering Matrix Array elements wherein pairs of elements point to corresponding relative offsets and contain corresponding exchange values. The counter starting increment and addition value is utilized to point at the Matrix Array's individual elements.

15. The Matrix Array element valuing is such that the element pairs contain random values comprising: Random value element pairs not equal to each other, either wholly or as independent elements, and individual elements of the pair not equal to each other. The methods Matrix Array preferably contains $2^{7}$ differentiated random value element pairs. A preferred total number of individual elements per Matrix Array equals $2^{8}$.

16. Uses a finite number of Matrix Arrays such that the method of the invention, as discussed in advantage 15, can be used to structure multiple independent Matrix Arrays and process them in an arbitrary order.

17. Uses a finite number of Matrix Arrays such that the method of the invention, as discussed in advantage 15, can be used to structure multiple independent Matrix Arrays and process them in a reverse order. Where a matrix array of a $2^{8}$ size is provided, one hundred and twenty eight (128) combinations (effectively different matrix arrays) can be provided or created. Though $2^{8}$ is preferred for the matrix array size, such value is not limiting and other sizes can be used and are all considered within the scope of the invention.

18. The computer implemented process of the invention allows an input dataset to also be an output dataset, by providing a unique mechanism for in-place data manipulation cryptography, wherein no additional physical space is needed for executing the process.

It should be readily apparent to those having ordinary skill in the art that the process of the invention also would include fundamental and/or common programming techniques, such as opening and closing of files, initialization of pointers, counters and variables, and other appropriate housekeeping techniques and routines. Furthermore, the computer implemented process of the present invention can be preloaded within the RAM of the computer for execution by the CPU of the computer.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A computer implemented process for data encryption or data decryption using an ordered element pair matrix array, the computer including a central processing unit which accesses a random access memory that controls an input/output device, said process comprising the steps of:
    (a) reading an input dataset with a physical read determined by an input/output control variable, said input/output control variable controlling a number of bytes read into a memory string;
    (b) replacing a value of a current data STRING byte with a value of a current element of a matrix array containing ordered element pairs;
    (c) adjusting an increment/decrement counter starting value and saving the adjusted value as a new STRING byte; and
    (d) repeating steps (a) through (c) until all data has been either encrypted or decrypted; wherein said process allows for encryption of data prior to its transmission or for decryption of encrypted data; wherein said process does not require the use of an inverse matrix array.

2. The computer implemented process of claim 1 further including the step of reversing the new STRING byte and saving as a reverse STRING byte prior to step (d) each time steps (a) through (c) are performed; wherein the size of the physical read can be varied by said input/output control variable for each input dataset.

3. The computer implemented process of claim 1 wherein in step (b) a plurality of ordered element pair matrix arrays are provided and can be processed in an arbitrary order.

4. The computer implemented process of claim 1 wherein a location of the input dataset is also the location of an output dataset to point data that has been encrypted or decrypted to the same location that the data originated from.

5. A computer implemented process for data encryption or data decryption using a computer, the computer including a central processing unit which accesses a random access memory that controls an input/output device, said process comprising the steps of:
    (a) reading an input dataset with a physical read determined by an input/output control variable, said input/output control variable controlling a number of bytes read into a memory string;
    (b) adding a value of a keypointer to a starting offset value of an access code key to determine a current element of the access code key;

(c) exclusive ORring the current element with a current value of a data STRING byte determined by a value of a STRING pointer and saving as a new data STRING byte value;

(d) replacing the new data STRING byte value with a value of a current element of a matrix array pointed to by a matrix array pointer and saving as a replaced data STRING byte value, said matrix array containing ordered element pain;

(e) subtract an increment/decrement counter starting value from the replaced data STRING byte value to yield a result and saving the result as a current STRING byte;

(f) reversing the byte(s) of data of the current STRING and saving as a reversed STRING;

(g) repeating steps (a) through (f) until all data has been either encrypted or decrypted;

wherein said process allows for encryption of data prior to its transmission or for decryption of encrypted data; wherein the size of the physical read can be varied by said input/output control variable each input dataset; wherein said process does not require the use of an inverse matrix array.

6. The computer implemented process of claim 5 further comprising the step of multiplying a value of a record counter by a value of the input/output control variable to yield a result which is used as an in-place relative offset pointer for inputting or outputting data in the dataset; wherein the location of the input dataset is also the location of the output dataset or another location.

7. The computer implemented process of claim 5 further comprising the step of exchanging a symbol set with a STRING byte pointed to by the STRING pointer after step (c).

8. The computer implemented process of claim 5 further including the step of adjusting the values of the keypointer, STRING pointer and a reverse STRING pointer prior to step (g).

9. The computer implemented process of claim 5 further including the steps of intitializing a tail counter and computing a tail counter starting value for processing any remaining data by a physical read determined by said input/output control variable.

10. The computer implemented process of claim 5 further including the steps of exclusive ORing a STRING byte pointed to by the STRING pointer with a non-embedded user XOR bit code and adjusting the value of the STRING pointer after step (c).

11. The computer implemented process of claim 5 wherein said process can be implemented directly from a disk inserted in a floppy disk drive without installing said process on a computer hard disk drive.

12. The computer implemented process of claim 5 further including the steps of incrementing a record counter and computing a physical input/output pointer after step (f).

13. The computer implemented process of claim 5 wherein a location of the input dataset is also the location of an output dataset to point data that has been encrypted or decrypted to the same location that the data originated from.

14. A computer implemented process for data encryption or data decryption using a computer, the computer including a central processing unit which accesses a random access memory that controls an input/output device, said process comprising the steps of:

(a) reading an input dataset with a physical read determined by an input/output control variable said input/output control variable controlling a number of bytes read into a memory string;

(b) replacing a current data STRING byte pointed to by a STRING pointer with a value of a current element of a matrix array pointed to by a matrix array pointer and saving as a replaced data STRING byte, said matrix array containing ordered element pairs;

(c) adding a decrement/increment counter starting value to a value of the replaced data STRING byte to yield a result and saving the result as a new STRING byte;

(d) exclusive ORing a value of a current element of an access code key with a current value of a data STRING byte determined by a value of the STRING point;

(e) adding a value of a keypointer to the starting offset value of the access code key, (f) reversing the byte(s) of data of the new STRING and saving as a reverse STRING;

(g) repeating steps (a) through (i) until all data has been either encrypted or decrypted;

wherein said process allows for encryption of data prior to its transmission or for decryption of encrypted data; wherein the size of the physical read can be varied by said input/output control variable for each input dataset; wherein said process does not require the use of an inverse matrix array.

15. The computer implemented process of claim 14 wherein a location of the input dataset is also the location of an output dataset to point data that has been encrypted or decrypted to the same location that the data originated from.

16. The computer implemented process of claim 14 further comprising the step of multiplying a value of a record counter by a value of the input/output control variable to yield a result which is used as an in-place relative offset pointer for inputting or outputting data in the dataset; wherein the location of the input dataset is also the location of the output dataset or another location.

17. The computer implemented process of claim 14 further comprising the step of exchanging a symbol set with a STRING byte pointed to by the STRING pointer after step (c).

18. The computer implemented process of claim 14 further including the step of adjusting the values of the keypointer, STRING pointer and a reverse STRING pointer prior to step (g).

19. The computer implemented process of claim 14 further including the steps of intitializing a tail counter and computing a tail counter starting value for processing any remaining data by a physical read determined by said input/output control variable.

20. The computer implemented process of claim 14 further including the steps of adjusting the value of the STRING pointer and exclusive ORing a STRING byte pointed to by the STRING pointer with a non-embedded user XOR bit code after step (c).

21. The computer implemented process of claim 14 wherein said process can be implemented directly from a disk inserted in a floppy disk drive without installing said process on a computer hard disk drive.

22. The computer implemented process of claim 14 further including the steps of incrementing a record counter and computing a physical input/output pointer after step (f).

* * * * *